United States Patent [19]

Tripp, Jr.

[11] Patent Number: 4,959,047
[45] Date of Patent: Sep. 25, 1990

[54] FLEXIBLE LOWER BODY NEGATIVE PRESSURE TROUSERS FOR $-G_z$ ACCELERATION PROTECTION

[75] Inventor: Lloyd D. Tripp, Jr., Dayton, Ohio

[73] Assignee: The United States of America as represented by the Secretary of the Air Force, Washington, D.C.

[21] Appl. No.: 335,621

[22] Filed: Apr. 10, 1989

[51] Int. Cl.⁵ .................. A61H 31/00; A61H 7/00
[52] U.S. Cl. .................. 600/19; 128/202.12; 128/30; 600/20
[58] Field of Search ............. 128/28, 30, 30.2, 202.12, 128/205.26, 202.19, 202.11; 600/19, 20

[56] References Cited

U.S. PATENT DOCUMENTS

| | | |
|---|---|---|
| 726,791 | 4/1904 | Armbruster . |
| 2,397,710 | 4/1946 | Versoy et al. .......... 128/1 |
| 2,531,074 | 11/1950 | Miller .................. 128/138 |
| 3,859,989 | 1/1975 | Spielberg ............. 128/24 R |
| 4,086,920 | 5/1978 | Mimere ................ 128/24 R |
| 4,151,612 | 5/1979 | Vykukal ................ 2/2.1 A |
| 4,242,024 | 1/1981 | Crosbie et al. ........ 128/1 A |
| 4,421,109 | 12/1983 | Thorton ................ 128/25 R |
| 4,455,685 | 6/1984 | Steffler et al. ........ 2/2.1 A |
| 4,534,338 | 8/1985 | Crosbie et al. ........ 600/19 |
| 4,583,522 | 4/1986 | Aronne ................. 128/1 A |
| 4,590,925 | 5/1986 | Dillon ................... 128/24 R |
| 4,638,791 | 1/1987 | Krogh et al. .......... 128/1 A |
| 4,674,479 | 6/1987 | Jennings et al. ...... 128/1 A |
| 4,691,695 | 9/1987 | Birk et al. ............. 128/38 |
| 4,753,226 | 6/1988 | Zheng et al. .......... 128/64 |
| 4,770,165 | 9/1988 | Hayek .................. 128/30 |

FOREIGN PATENT DOCUMENTS 2839283  3/1980  Fed. Rep. of Germany ........ 128/30

OTHER PUBLICATIONS

"Cardiovas. Responses of Women to Lower Body Neg. Press," M. A. Bassett Frey et al, Aviation Space and Env. Med. Jun., 1986.
"Soviet Space Station", N. Timacheff, Space Station Medical Sciences Concept, NASA Tech Memo 58255, Feb., 1984.
"Effects of Var. Countermeasures Against the Adverse Eff. of Wtlessness on Cen. Circ. in the Healthy Man", O. G. Gazenko et al, Aviation Space & Environment Jun., 82.

(List continued on next page.)

Primary Examiner—Randall L. Green
Assistant Examiner—K. M. Reichle
Attorney, Agent, or Firm—Fredric L. Sinder; Donald J. Singer

[57] ABSTRACT

A flexible lower body negative pressure (LBNP) anti-G suit for protecting against the adverse effects of $-G_z$ acceleration is disclosed. Conventional anti-G suits protect against the adverse effects of $+G_z$ acceleration. Accelerations in the negative z direction, $-G_z$, can also cause adverse physiological effects and, additionally, severely unpleasant subjective sensations. LBNP has been used in the past to alleviate the somewhat similar physiological effects of weightlessness in space. It has also been used with merely limited success to treat various medical problems. The present invention provides an improved LBNP suit that successfully alleviates the adverse physiological and subjective effects of $-G_z$ accelerations. Applying LBNP to an aircrew member increases venous vascular volumes in the lower body and reduces the otherwise increased pressures in the upper cardiovascular system. The present invention also provides improved methods for using LBNP as a treatment for medical problems. A first LBNP anti-G suit is constructed primarily of a gas impermeable fabric over internal frame sections. An open weave stiff pad-like fabric inside helps maintain air flow between an aircrew member's body and the inside of the suit. A second LBNP anti-G suit is constructed of a gas impermeable fabric over only the pad-like fabric. The invention also teaches using more negative pressures than have been used in the prior art for medical treatments.

9 Claims, 3 Drawing Sheets

OTHER PUBLICATIONS

Negative pressures of −100 mmHg and lower will produce good medical results.

"Lower Body Neg. Press. Box for —G$_z$Sim. in the Upright Seated Pos.", M. T. Lategola, Aviation, Space & Environ. Medicine, Nov., 1979.

"Card, Response of Men and Women to Lower Body Neg. Press.", L. D. Montgomery et al, Aviation, Space, & Environment Medicine, Feb., 1977.

"Lower Body Neg. Press, Third Manned Skylab Miss.", R. L. Johnson et al, Aviation, Space, & Environment Medicine, 1976.

"Physiological Eff. of Locally Applied Red. Press. in Man", R. A. Wolthuis et al, Physiological Reviews Jul., 1974.

"Changes in Total Leg Vol. During Low. Body Neg. Press." F. S. Musgrave et al, Aerospace Medicine, Jun., 1969.

"Hemodynamic Eff. of Hypovolemia in Nor. Sub. Patients w/Congestive Heart Fail." R. H. Murray, Circulation, Jan., 1969.

"Hemodynamic Eff. of Graded Hypo. and Vasod. Syncope Ind. by Low. Body Neg. Press," R. H. Murray, American Heart Journal, Dec., 1968.

"Effects of Low. Body Neg. Press, on the Card. System", P. M. Stevens, The Amer. Journal of Cardiology, Oct., 1965.

"Devices for Protection Against Neg. Acc." H. O. Sieker, Jun., 1952.

"Studies of the Phy. of Neg. Acc." J. P. Henry, AF Tech. Rep. Oct., 1950.

"Studies of the Phy. of Negative Acc." J. P. Henry, AF Technical Report, Oct., 1950.

"The Acute Circ. Eff. of the Head–Down Pos. (Neg. G) in Nor. Man w/a Note on Some Meas. Des. to Rel. Cran. Con in this Position," R. W. Wilkins et al, 1950.

FLEXIBLE LOWER BODY NEGATIVE PRESSURE TROUSERS FOR $-G_z$ ACCELERATION PROTECTION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to anti-G suits, and more specifically to flexible lower body negative pressure (LBNP) trousers for protection from the adverse affects of $-G_z$ acceleration and for other uses.

Conventional anti-G suits, such as are described in U.S. Pat. No. 4,674,479 to Jennings et al for an improved anti-G suit, protect pilots and other aircrew of high performance aircraft from the adverse physiological effects of high acceleration in the positive z direction (upwards relative to an aircraft), commonly written as $+G_z$. Adverse physiological effects, however, also result from acceleration in the negative z direction, written as $-G_z$, and at acceleration levels lower than are normally considered harmful in the positive z direction.

In addition to $-G_z$ accelerations that may occur during a variety of flight maneuvers, such as steep dives and outside loops, $-G_z$ accelerations can also occur during atmospheric reentry of transatmospheric space vehicles, particularly smaller, more streamlined space vehicles that may exist in the future.

The limit of a unprotected aircrew member's tolerance against the adverse physiological effects of $-G_z$ acceleration is about $-2.5\ G_z$. His or her tolerance limit against the severely unpleasant subjective sensations from $-G_z$ acceleration is only about $-2.0\ G_z$. The adverse physiological effects can be separated into two primary groups. In the first group, blood shifts to the head and increases cerebral venous and arterial pressures. The resulting increased pressure in the capillary system disrupts the normally balanced Starling forces, which move tissue fluids in and out of the capillaries, and causes edema. Further pressure increases, particularly venus pressures above 70 mmHg, may cause pain, increased facial edema, conjunctival hemorrhages, vision difficulties, sinus pain, headaches, severe nose bleeds and bleeding into the nasal sinuses.

The second group of adverse physiological effects of $-G_z$ acceleration are the most dangerous, particularly severe bradycardia. The increase in cephalad (headward) arterial pressures stimulates the baroreceptors in the carotid sinuses and in the wall of the aortic arch to cause a reflex increase in vagus nerve impulse which decreases heart rate. The baroreceptors are very sensitive to large changes in arterial pressures, especially from baseline values. Negative $G_z$ acceleration has been shown to cause periods of asystole (cessation of the pumping heart contraction), sinus arrest (long pauses between heart beats) and occasional incapacitation.

Prior art attempts to protect against the negative effects of $-G_z$ acceleration have included various means of applying pressure to the head and/or neck in an attempt to resist the blood shift and to decrease the baroreceptor response. Neck-sealed pressurized helmets, experimented with by the U.S. Air Force in the 1950's, were pressurized with positive pressures of 100 mmHg with good results, but required the aircrew member to hold his breath to protect from overinflating the lungs and to hold his mouth open to equalize pressure between the ears and sinuses. Arterial occlusion cuffs on lower extremities, to diminish venous return from the legs, have been used with some success to at least reduce cephalad venous pressure. Unfortunately, these methods have not provided a fully successful solution to the problems of $-G_z$ acceleration.

Applying a negative pressure (relative to the pressure of the atmosphere surrounding the body) to the lower body of a human, called lower body negative pressure or LBNP, has been used to resist the shift of blood in addressing problems other than the effects of $-G_z$ acceleration. So-called space adaptation sickness, for example, which results from exposure to weightlessness, is somewhat physiologically similar to the effects of $-G_z$ acceleration. An LBNP suit has been used in Soviet space flights to resist the shift of blood to the head during exposure to zero gravity. NASA has also developed a LBNP suit for possible use by U.S. astronauts during exposure to zero gravity. The NASA suit, described in U.S. Pat. No. 4,421,109 to Thornton, uses a gradiently applied negative pressure (more negative toward the feet) to better simulate the effect of normal gravity on an astronaut. The NASA patent appears to teach that, to be safe, the level of negative pressure surrounding the trunk area of a human should not be too far from atmospheric pressure. Also, both the NASA and Soviet suits visually appear to not cover the abdominal area.

LBNP has also been used as an attempted treatment for congestive heart failure. Negative pressures of $-30$ mmHg to $-50$ mmHg were used and did not produced sufficiently successful results to bring about its adoption as a standard treatment.

Despite the prior art teachings of the use of LBNP to alleviate the adverse effects of weightlessness, as a treatment for a variety of medical problems and even to simulate the effects of $+G_z$ accelerations, the prior art has not realized the possible use of LBNP for protecting against the effects of $-G_z$ acceleration. Thus it is seen that there is a need for a lower body negative pressure anti-G suit specifically made for protecting against the adverse effects of $-G_z$ acceleration.

It is, therefore, a principal object of the present invention to provide an LBNP anti-G suit specifically adapted to provide protection against the adverse effects of $-G_z$ acceleration.

It is another object of the present invention to provide an improved LBNP suit for alleviating the adverse effects of exposure to zero gravity environments.

It is yet another object of the present invention to provide an improved LBNP suit that will also work as part of a conventional positive pressure anti-G suit for protecting against $+G_z$ acceleration.

It is a further object of the present invention to provide a use for an LBNP suit that alleviates a variety of harmful medical conditions.

It is a feature of the present invention that, despite its bulky appearance, it is very flexible and does not overly hinder an aircrew member.

It is an advantage of the present invention that it provides aircrew members significant protection against the subjective discomfort from $-G_z$ acceleration, which will greatly increase the operating envelope and operational advantage for fighter aircrew members.

It is another advantage of the present invention that it provides a dual-use anti-G suit that provides protection against both positive and negative $G_z$ accelerations.

These and other objects, features and advantages of the present invention will become apparent as the description of certain representative embodiments proceeds.

SUMMARY OF THE INVENTION

The present invention provides a lower body negative pressure anti-G suit specifically made for protecting against the adverse effects of $-G_z$ acceleration. It also provides improved methods for therapeutically treating various harmful medical conditions The unique discovery of the present invention is that LBNP will successfully alleviate the adverse physiological effects of $-G_z$ acceleration. Also, it has been discovered that the rigid frame of the anti-G suit can be eliminated to make a dual-use anti-G suit that provides protection against both positive and negative $G_z$ accelerations. Additionally, it has been discovered that the negative pressures previously used for treating congestive heart failure are not low enough to achieve good therapeutic results and that more negative pressures will solve those prior art difficulties. Further, it has been discovered that pulsing the application of negative pressure in synchronization with the heartbeat provides even greater therapeutic effects.

Accordingly, the present invention is directed to an anti-G suit for wear by an aircrew member comprising a frame having a rigid abdominal frame section for generally surrounding in a spaced relationship the abdominal area of the aircrew member, a pair of mid-leg frame sections, each mid-leg frame section comprising a pair of spaced rigid bands for generally surrounding in a spaced relationship part of each leg of the aircrew member, wherein each pair of rigid bands are attached to each other by hinge means for providing flexibility at the knee of the aircrew member, and a pair of rigid calf frame sections, each calf frame section for generally surrounding in a spaced relationship a calf of the aircrew member, a pair of gas impermeable boots for covering each foot of the aircrew member, a gas impermeable fabric covering the frame to form generally the shape of a pair of trousers, gas permeable pad means, covering generally the inside of the rigid abdominal frame section and extending for a distance down through the inside of the anti-G suit, for providing comfort and for allowing a generally free flow of gas between the aircrew member and the inside of the anti-G suit, means for sealing the portion of the fabric area extending above the abdominal frame to the body of the aircrew member to form a substantially gas impermeable seal, means for sealing the portion of the fabric area extending below the calf frames to the boots to form a substantially gas impermeable seal, and connecting means for operatively interconnecting the inside of the anti-G suit to a source of negative pressure.

The invention is also directed to a method for protecting an aircrew member from the adverse effects of negative $G_z$ acceleration comprising the step of, in an aircraft undergoing negative $G_z$ acceleration, applying a negative pressure to the lower body of the aircrew member.

The invention is additionally directed to an anti-G suit for wear by an aircrew member and for protecting against the adverse effects of both negative and positive $G_z$ accelerations comprising a gas impermeable lower body covering having generally the shape of a pair of trousers, separate means for sealing the lower body covering at its top and bottom to the aircrew member, means, covering generally the inside of the lower body covering, for allowing a generally free flow of gas between the aircrew member and the inside of the anti-G suit, connecting means for operatively interconnecting the inside of the anti-G suit to a source of negative pressure, and means for applying a compressive force to a portion of the body of the aircrew member covered by the anti-G suit. The means for allowing a generally free flow of gas between the aircrew member and the inside of the anti-G suit may comprise gas permeable pad means or may comprise wire-reinforced plastic. The anti-G suit may further comprise a pair of gas impermeable boots for covering each foot of the aircrew member and means for sealing the lower body covering at its bottom to the boots.

The invention is further directed to a method for therapeutically treating a patient suffering from congestive heart failure, comprising the step of, on a patient suffering from congestive heart failure, applying a negative pressure of about $-100$ mmHg and lower to the lower body of the patient. The negative pressure may be pulsed in synchronization with the heartbeat of the patient.

The invention is yet further directed to a method for therapeutically treating a patient with poor peripheral circulation, comprising the step of applying a pulsed negative pressure to a limb of the patient, wherein the negative pressure is applied in synchronization with the heartbeat of the patient.

DESCRIPTION OF THE DRAWINGS

The present invention will be more clearly understood from a reading of the following detailed description in conjunction with the accompanying drawings wherein.

DETAILED DESCRIPTION

Figure 1:
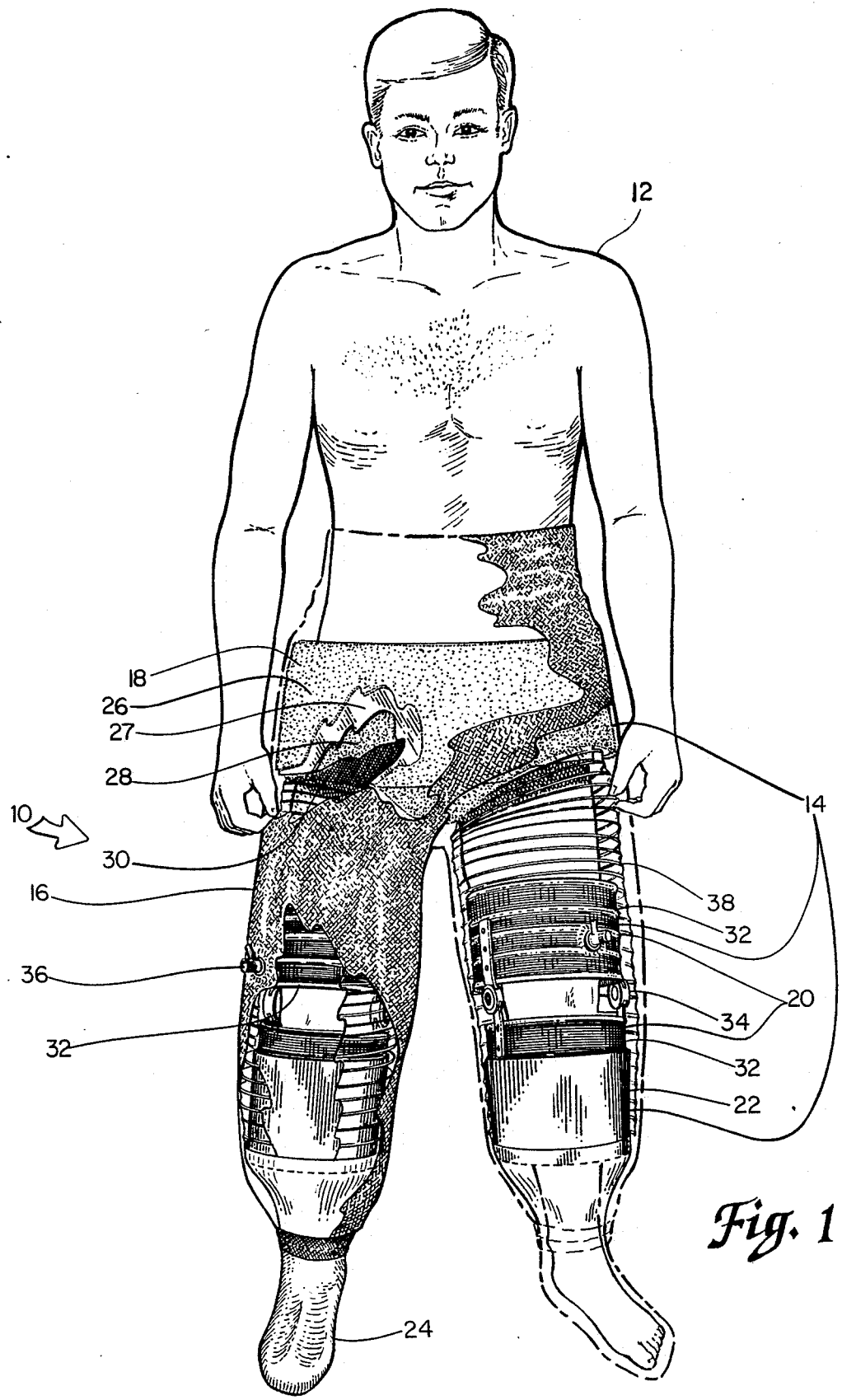
FIG. 1 is a part cutaway, part phantom front view of a lower body negative pressure anti-G suit constructed according to the teachings of the present invention.

Referring now to FIG. 1 of the drawings, there is shown a part cutaway, part phantom front view of a lower body negative pressure (LBNP) anti-G suit 10 constructed according to the teachings of the present invention. Suit 10 has an overall shape of a pair of trousers and is worn by an aircrew member 12 as shown in the figure. A multi-section internal frame 14 supports and is covered by a fabric 16. Frame 14 comprises rigid abdominal frame section 18. A pair of rigid mid-leg frame sections 20 and a pair of rigid calf frame sections 22. Fabric 16 is woven nylon impregnated with neoprene to make it gas impermeable. It is adhesively joined at its bottom to the tops of a pair of gas impermeable boots 24 and at its top to the body of aircrew member 12. Contact cement has worked well for sealing fabric 16 to boots 24. The seal to aircrew member 12 has been made by wrapping fabric 16 around the torso and then wrapping an elastic bandage around fabric 16 to hold it snugly against the body. Applying tincture of benzoin to the aircrew member's body as an adhesive before wrapping fabric 16 has contributed to a more successful seal.

Figure 2:
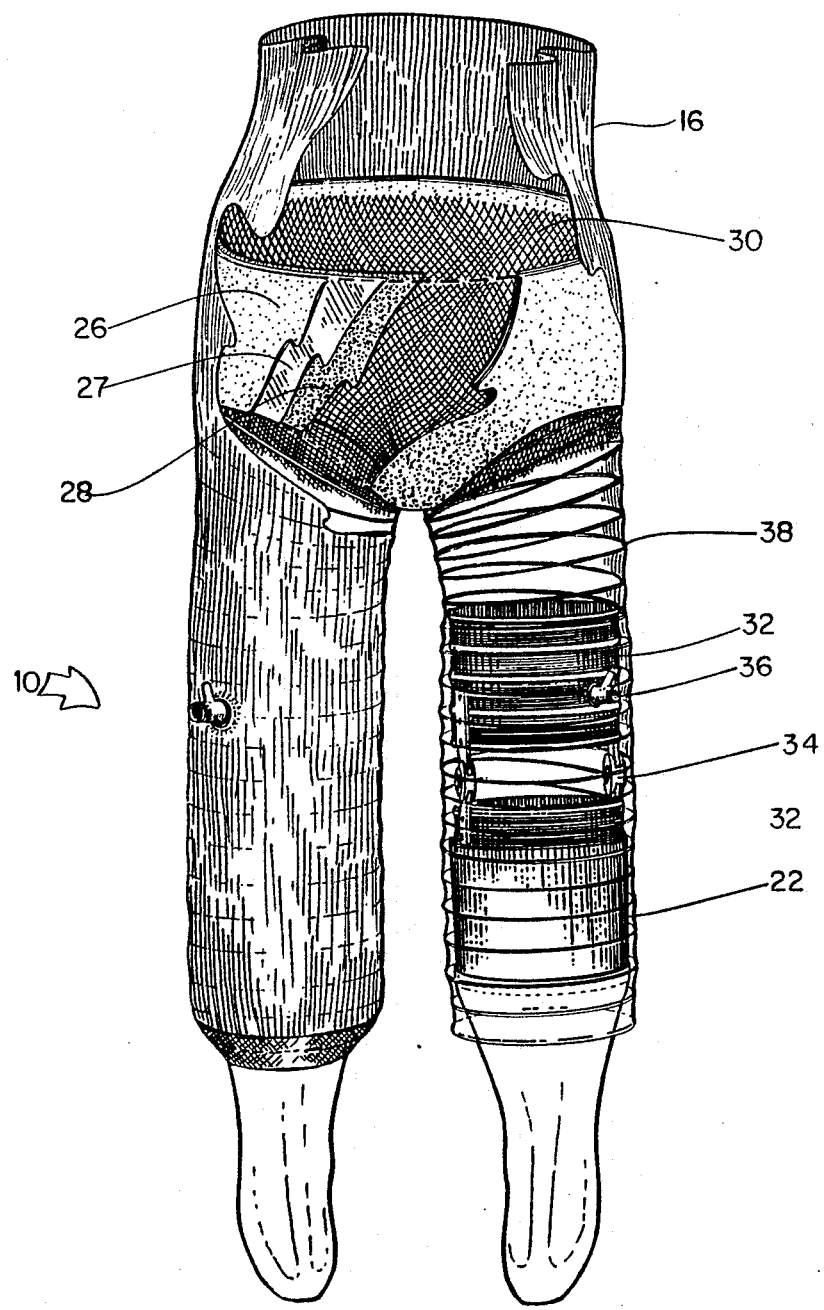
FIG. 2 is a cutaway front view of the LBNP suit of FIG. 1 under construction; and, FIG. 3 is a phantom front view of a combination lower body negative pre sure anti-G suit and conventional bladder-type positive pressure anti-G suit.

Abdominal frame section 18 comprises a thermoplastic (KYDEX®) outer shell 26 for rigidity and a thermofoam inner lining 28 for comfort. Outer shell 26, as is better shown in the FIG. 2 cutaway view of suit 10 under construction, has generally the shape of a pair of briefs. An aluminum reinforcing plate 27 fits in the front of abdominal frame section 18 between outer shell 26 and inner liner 28 for added rigidity. An open weave, gas permeable pad-like fabric 30 is attached inside abdominal frame section 18 and extends for a distance inside suit 10 toward mid-leg frame sections 20. Pad-like fabric 30 is made from nylon, is about ⅛ inch thick and has been used inside space suits to permit free flow of air, or other gas, through the space suit by maintaining a small space between the space suit inner lining and an astronaut. It also provides a degree of comfort from edges and projections inside anti-G suit 10. A suitable fabric is believed to have been sold 15 under the trademark TRILOCK ™.

Mid-leg frame sections 20 comprise a pair of spaced rigid bands 32 connected by hinges 34. Bands 32 are made by cutting sections of ribbed polyethylene pipe such as is used in construction. Hinges 34 are the type normally used on orthopaedic leg braces and provide flexibility at the knees of aircrew member 12.

Calf frame sections 22 have a conical frustum shape (indicated only very slightly in FIG. 1) and are made by wrapping orthopaedic casting tape around a mold and then allowing to harden. In this embodiment, calf frame sections 22 are slip fit over the bottoms of mid-leg frame sections 20.

One inch evacuation ports 36 are attached through fabric 16 and each mid-leg frame section 20. Each port 36 has an ⅛ inch diameter pressure monitoring port extending from its side.

While not critical to the operation of suit 10, spiral-wire reinforced cellophane 38 was used between frame sections and fabric 16 to, among other reasons, help maintain the outer shape of suit 10.

In use, a commercial grade vacuum motor capable of creating a 22 cubic foot per minute flow rate, governed by a microcomputer controlled valve, is connected to ports 36 and air evacuated to achieve a desired negative pressure. In tests, the vacuum pump was allowed to reach full operating speed before the valve to ports 36 was opened. Air was evacuated from suit 10 to negative lower body pressures of $-50$ mmHg and $-100$ mmHg. At both negative pressures, test subjects experiencing $-2.0$ $G_z$ acceleration for 30 second exposures were successfully protected from the first group adverse effects of $-G_z$ acceleration. Further, in protecting against the second group adverse effect of decreased heart rate, an average increase of 56 beats per minute was observed over an unprotected subject. Additionally, the test subjects reported less subjective discomfort with the LBNP anti-G suit than when unprotected. Extending the area over which negative pressure is applied to include the abdominal area markedly increases the available venous volume that can be increased by applying negative pressure.

LBNP causes many cardiovascular changes which counteract the adverse physiological effects of $-G_z$. LBNP decreases right and left heart volumes and shifts 500 to 1,000 cc of mostly venous vascular volume towards the pelvis and legs, thereby reducing cephalad pressure and the load on the baroreceptors. The resulting reduced amount of blood returning to the heart causes a reflex increase in heart rate. Cardiac output may also increase, as may renal circulation, filtration and diuretic activation time. These positive effects can occur at LBNP's of $-30$ mmHg to $-50$ mmHg and possibly contributed to the failure of previous researchers to use even lower pressures in their attempts to use LBNP as a treatment for congestive heart failure. More negative pressures of about $-100$ mmHg, and lower, are required to produce medically significant good results. Additionally, the best use of LBNP in treating congestive heart failure is likely as an emergency treatment before conventional diuretic medications begin to show a therapeutic effect.

Figure 3:
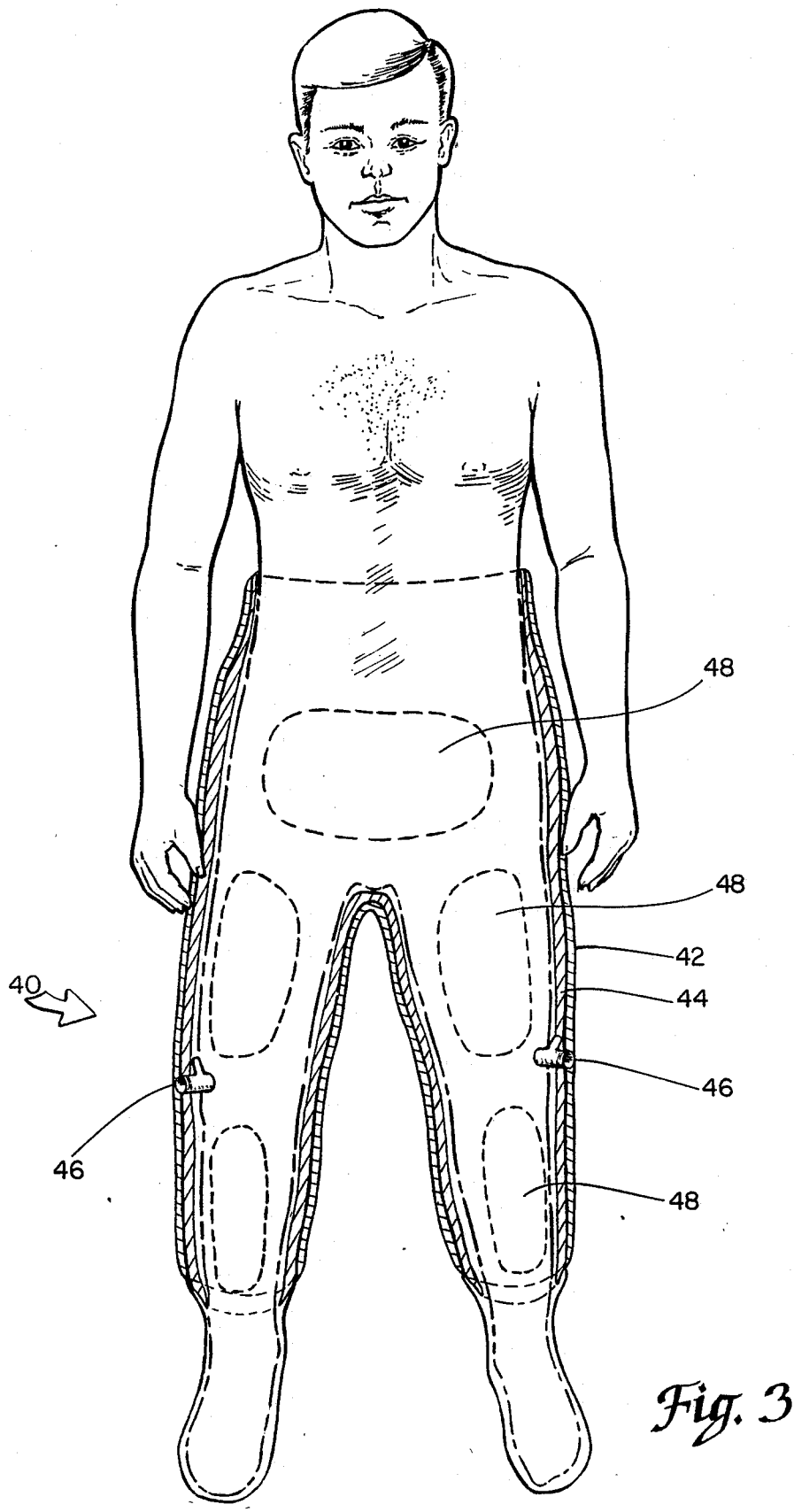

FIG. 3 shows a phantom front view of a combination lower body negative pressure anti-G suit and conventional bladder-type positive pressure anti-G suit. Dual-use anti-G suit 40 has a gas impermeable fabric 42 outer covering in the general shape of a pair of trousers. An open weave gas permeable pad-like fabric 44, having a stiff open-weave, covers the inside of gas impermeable fabric 42 and maintains a small spacing between suit 40 and the body of an aircrew member. Fabric outer covering 42 is shown thicker in relation to pad-like fabric 44 than it would be in an actual suit to better differentiate in the drawing the two fabric layers. When air, or other cockpit enclosure gas, is evacuated from suit 40 though ports 46 in response to exposure to $-G_z$ acceleration, rather than merely drawing in suit 40 against the lower body to compress the body and undesirably reduce the venous volume available to counteract the blood shift from $-G_z$ acceleration, apparently only the narrow threads of pad-like fabric 44 press against the aircrew member's body, thereby leaving a large enough surface area exposed to the negative pressure for a sufficient portion of the aircrew member's body volume to be drawn into the weave and increase the venous volume. Alternatively the weave may crush slightly to allow for increased venous volume. Some previous research indicates that veins can, to some extent, expand under negative pressure without a corresponding increase in body volume surrounding the vein. In any event, tests show that the pad-like fabric used without a frame works.

When the aircrew member is exposed to $+G_z$ acceleration, conventional bladders 48 are inflated and will sufficiently press against the aircrew member's body to reduce lower body venous volume and provide protection against $+G_z$ acceleration.

It will be seen by those with skill in the art of the invention from the foregoing teachings that other materials than described pad-like fabric 44 may work as well. It is understood that the term pad-like is used in its most expansive sense to include any functionally equivalent structure. For example, a plastic honeycomb structure with perforated (for air flow) cell walls may work very well. The cell walls should be structurally shaped to provide maximum compressive strength with minimum weight, while also providing reasonable resiliency for comfort and to allow for body volume expansion. The honeycomb can be made thick enough and its openings large enough to facilitate body volume expanding into the openings under negative pressure.

Those will skill in the art, upon comprehending the operation of the invention, will also see that a variety of other means may be adapted or used to provide the separation needed to provide a space or volume expansion of an aircrew member's body under negative pressure, while maintaining sufficient flexibility so that conventional anti-G suit air bladders may be able to successfully compress the suit against the body of the aircrew member. For example, a frame material similar to previously described spiral-wire reinforced cellophane 38, or a series of coaxial wire bands, will provide an anti-G suit structure very resistant to changes in its circumference, so that it will retain a chamber shape under application of negative pressure, but also very compliant to externally applied inward pressure so that air bladders may successfully compress it.

It will further be seen by those with skill in the art that the improvements taught by Jennings et al, particularly the butt strap, will work especially well with dual-use anti-G suits.

As previously described, the prior art has attempted to use LBNP in treating various medical problems, but has failed to achieve completely successful results. Negative pressures sufficient to achieve desired physiological effects in otherwise healthy test subjects have proved insufficient to effectively treat already ill patients. The use of much more negative, or lower, pressures, about $-100$ mmHg and lower, will achieve more successful results. Also, pulsing the negative pressures in synchronization with the patient's heart beat increases the positive effect. Similarly, pulsing negative pressures on any limb of a patient suffering from poor circulation, or related illnesses, improves circulation and promotes wound healing.

The disclosed anti-G suits and methods successfully demonstrate the use of LBNP for protecting against adverse effects of $-G_z$ acceleration and for various medical applications. Although the disclosed use is specialized, its teachings will find application in other areas whether it is desired to advantageously apply external forces to a living body.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. An anti-G suit for wear by an aircrew member, comprising:
    (a) a frame, comprising:
        (i) a rigid abdominal frame section, having generally the shape of a pair of briefs, for generally surrounding in a space relationship the abdominal area of the aircrew member;
        (ii) a pair of mid-leg frame sections, each mid-leg frame section comprising a pair of spaced rigid bands for generally surrounding in a spaced relationship part of each leg of the aircrew member, wherein each pair of rigid bands are attached to each other by hinge means for providing flexibility at the knee of the aircrew member; and,
        (iii) a pair of generally cylindrical rigid calf frame sections, each calf frame section for generally surrounding in a spaced relationship a calf of the aircrew member;
    (b) a pair of gas impermeable boots for covering each foot of the aircrew member;
    (c) a gas impermeable fabric covering the frame to form generally the shape of a pair of trousers;
    (d) gas permeable pad means, covering generally the inside of the rigid abdominal frame section and extending for a distance down through the inside of the anti-G suit, for providing comfort and for allowing a generally free flow of gas between the aircrew member and the inside of the anti-G suit;
    (e) means for sealing the portion of the gas impermeable fabric extending above the abdominal frame to the body of the aircrew member to form a substantially gas impermeable seal;
    (f) means for sealing the portion of the gas impermeable fabric extending below the calf frames to the boots to form a substantially gas impermeable seal; and,
    (g) connecting means for operatively interconnecting the inside of the anti-G suit to a source of negative pressure.

2. An anti-G suit for wear by an aircrew member and for protecting against the adverse effects of the both negative and positive $G_z$ accelerations, comprising:
    (a) a gas impermeable lower body covering having generally the shape of a pair of trousers;
    (b) first means for sealing the lower body covering at its top to the aircrew member, and second means for sealing the lower body covering at its bottom to the aircrew member;
    (c) means, covering generally the inside of the lower body covering, for allowing a generally free flow of gas between the aircrew member and the inside of the anti-G suit;
    (d) connecting means for operatively interconnecting the inside of the anti-G suit to a source of negative pressure; and,
    (e) means for applying a compressive force to a portion of the body of the aircrew member covered by the anti-G suit.

3. The anti-G suit according to claim 2, wherein the means for allowing a generally free flow of gas between the aircrew member and the inside of the anti-G suit comprises gas permeable pad means.

4. The anti-G suit according to claim 2, wherein the means for allowing a generally free flow of gas between the aircrew member and the inside of the anti-G suit comprises spiral-wire reinforced plastic.

5. The anti-G suit according to claim 2, wherein the means for sealing the lower body covering at its bottom to the aircrew member comprises:
    (a) a pair of gas impermeable boots for covering each foot of the aircrew member; and,
    (b) means for sealing the lower body covering at its bottom to the boots.

6. A method for protecting an aircrew member from the adverse effects of negative $G_z$ acceleration, comprising the step of, in an aircraft undergoing negative $G_z$ acceleration, applying a negative pressure to the lower body of the aircrew member.

7. A method for therapeutically treating a patient suffering from congestive heart failure, comprising the step of, on a patient suffering from congestive heart failure, applying a negative pressure of about $-100$ mmHg and lower to the lower body of the patient.

8. The method according to claim 7, wherein the negative pressure is pulsed in synchronization with the heartbeat of the patient.

9. A method for therapeutically treating a patient with poor peripheral circulation, comprising the step of applying a pulsed negative pressure to a limb of the patient, wherein the negative pressure is applied in synchronization with the hearbeat of the patient.

* * * * *